J. R. McCLAIN.
SELF LUBRICATING GEAR.
APPLICATION FILED JULY 10, 1918.

1,401,622.

Patented Dec. 27, 1921.

WITNESSES:
R.J. Fitzgerald
O.E. Bee.

INVENTOR
John R. McClain.
BY
Wesley G. Carr
ATTORNEY

UNITED STATES PATENT OFFICE.

JOHN R. McCLAIN, OF EDGEWOOD, PENNSYLVANIA, ASSIGNOR TO WESTINGHOUSE ELECTRIC AND MANUFACTURING COMPANY, A CORPORATION OF PENNSYLVANIA.

SELF-LUBRICATING GEAR.

1,401,622.　　　　Specification of Letters Patent.　　Patented Dec. 27, 1921.

Application filed July 10, 1918. Serial No. 244,187.

*To all whom it may concern:*

Be it known that I, JOHN R. McCLAIN, a citizen of the United States, and a resident of Edgewood, in the county of Allegheny and State of Pennsylvania, have invented a new and useful Improvement in Self-Lubricating Gears, of which the following is a specification.

My invention relates to self-lubricating gears, and it has for its primary object the construction of a self-sustaining gear composed of impregnated sheet material and having a lubricant distributed uniformly throughout its structure.

Self-sustaining gears have been constructed of impregnated sheet material which have lubricating qualities of limited extent which I have found may be advantageously supplemented by distributing a lubricant, such as graphite, throughout the structure. A small percentage of lubricant distributed throughout the structure of a gear formed of impregnated sheet material greatly lengthens the life of the gear if it is run dry. In view of this, one object of my invention is to construct a gear of impregnated sheet material having a lubricant uniformly distributed throughout its structure.

Another object of my invention is to construct a gear or machine element of impregnated sheet material, the gear or machine element being cut from preformed blanks and containing a wax which will insure a finished product having a smooth surface.

It is well known that certain materials, such, for example, as graphite, possess desirable lubricating qualities but are non-adhesive and, if distributed in a structure comprising sheet material impregnated with a suitable binder, will tend to reduce the strength of the final product. In view of this, a still further object of my invention is to so construct a molded article of impregnated fibrous material containing uniformly distributed graphite that there shall be no undue weakening of any part of the structure.

Figure 1:
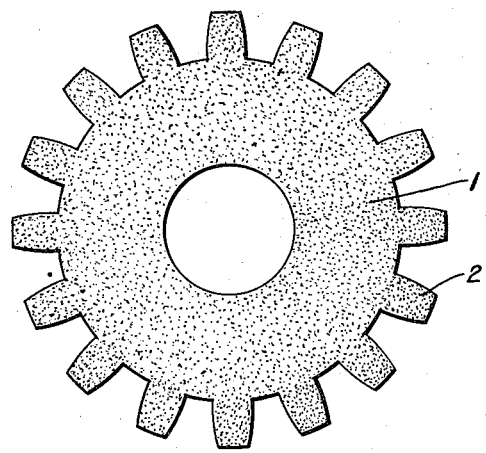
Figure 2:
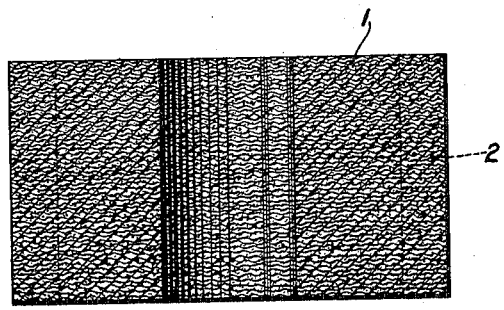

With these and other objects in view, my invention will be more fully understood by reference to the drawings in which Figure 1 is a side elevation of an ordinary spur-gear constructed in accordance with my invention, and Fig. 2 is a diametral sectional view of the gear shown in Fig. 1.

In practising my invention, I employ sheets of fibrous material treated with a binder, such as a phenolic condensation product. I may employ a fibrous sheet material such as duck which may be drawn through a bath of adhesive material, such as a phenolic condensation product, and then heated to slightly dry the phenolic condensation product. The material thus treated may then be coated on one side with a mixture of an adhesive, such as a phenolic condensation product and graphite, great care being taken to insure a uniform distribution of the graphite over the treated sheet material. A preferred treatment of the duck is to subject it to a bath of adhesive material containing graphite after which it may be slightly dried and an additional coating of adhesive, without graphite, may be applied, thus insuring undiminished binding action between the layers of material. The material thus treated may then be cut in suitable sheets and stacked to a predetermined thickness. The stacked sheets may then be subjected to heat and pressure to compact the material and harden the binder, after which a further application of heat may be employed to thoroughly dry the structure and convert it to a hard, insoluble mass. The plates thus formed may then be machined in the usual manner employed in constructing gears.

It has been found advantageous to add a small percentage of wax in the mixture containing the graphite for the reason that, when the teeth are cut in the preformed plates, a smoother surface may be obtained.

In Fig. 1 is shown an ordinary spur-gear having a body portion 1 and teeth 2, the body portion 1 and teeth 2 both being of the same material, which may be duck impregnated with a binder, such as a phenolic condensation product. Duck is preferred on account of its resilient qualities and the close knitting effect which is obtained when layers of it are bound together by means of an adhesive which has been hardened under heat and pressure. The duck, having an irregular surface, tends to trap the graphite, when employed with a suitable binder, in the depressions on its surface and minimizes, in this way, the tendency of the graphite to reduce the binding effect of the adhesive. If duck is employed as the sheet material forming the body portion 1 and the teeth 2, it is found advantageous to employ a small percentage of wax distributed throughout the entire structure so that, when the teeth 2 are cut, the working surfaces of the teeth will have no projecting fibers.

The amount of wax preferred is 1% of the binder employed. The wax also acts as an additional lubricant as well as insuring a smooth finished surface. A lubricant, such as soap-stone, or the like, may replace the graphite in the mixture which is applied to the sheet material after being drawn through a bath of an adhesive material. The amount of lubricant is usually 15% of the total weight of material in the product but this amount may be varied according to the degree of lubrication required.

Although I have specifically described a method of constructing a spur-gear in accordance with my invention, it is obvious that other machine elements may be constructed in a similar manner without departing from the spirit of my invention. The proportion of material utilized is determined by the nature of the finished article desired. I desire, therefore, that no limitations shall be imposed except such as are indicated in the appended claims.

I claim as my invention:

1. A self-sustaining gear comprising superimposed layers of duck impregnated with a hardened phenolic condensation product having a mixture of graphite and wax uniformly distributed therein.

2. A self-sustaining gear comprising superimposed layers of duck impregnated with a hardened phenolic condensation product containing wax.

In testimony whereof, I have hereunto subscribed my name this 29th day of June, 1918.

JOHN R. McCLAIN.